United States Patent
Popeney et al.

(10) Patent No.: US 11,220,624 B2
(45) Date of Patent: Jan. 11, 2022

(54) SALT-TOLERANT, FAST-DISSOLVING, WATER-SOLUBLE RHEOLOGY MODIFIERS

(71) Applicant: ChampionX USA Inc., Sugarland, TX (US)

(72) Inventors: Christopher Steven Popeney, Sugar Land, TX (US); En-Wei Lin, Naperville, IL (US); Paul Joseph Zinn, Oswego, IL (US); Pious Kurian, Sugar Land, TX (US); Heinrich Enoch Bode, Aurora, IL (US)

(73) Assignee: ChampionX USA Inc., Sugar Land, TX (US)

( * ) Notice: Subject to any disclaimer, the term of this patent is extended or adjusted under 35 U.S.C. 154(b) by 89 days.

(21) Appl. No.: 16/523,642

(22) Filed: Jul. 26, 2019

(65) Prior Publication Data

US 2020/0032133 A1    Jan. 30, 2020

Related U.S. Application Data

(60) Provisional application No. 62/711,983, filed on Jul. 30, 2018.

(51) Int. Cl.
  *C09K 8/68* (2006.01)
  *C08F 220/56* (2006.01)

(52) U.S. Cl.
  CPC .............. *C09K 8/68* (2013.01); *C08F 220/56* (2013.01); *C08F 2800/10* (2013.01)

(58) Field of Classification Search
  None
  See application file for complete search history.

(56) References Cited

U.S. PATENT DOCUMENTS

| | | |
|---|---|---|
| 3,963,684 A | 6/1976 | Evani et al. |
| 4,008,202 A | 2/1977 | Evani et al. |

(Continued)

FOREIGN PATENT DOCUMENTS

| | | |
|---|---|---|
| CA | 2818847 A1 | 5/2012 |
| CN | 101284893 A | 10/2008 |

(Continued)

OTHER PUBLICATIONS

Dastan, Sareh et al., Hydrophobically associating terpolymers of acrylamide, alkyl acrylamide, and methacrylic acid as EOR thickeners, J Polym Res (2016) 23: 175, 18 pages.

(Continued)

*Primary Examiner* — John J Figueroa
(74) *Attorney, Agent, or Firm* — Stinson LLP

(57) ABSTRACT

Compounds, compositions and methods of use thereof are provided, the compounds comprising a hydrophobically modified polyelectrolyte comprising a nonionic monomer, an ionic monomer, a monomer having the structure of Formula 1, and a monomer having the structure of Formula 2, (1)

(Continued)

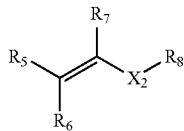

(2)

wherein $R_1$, $R_2$, $R_3$, $R_5$, $R_6$, and $R_7$ are independently hydrogen, unsubstituted alkyl, substituted alkyl, carbonyl, carboxyl, aryl, or alkaryl; $R_4$ is linear $C_3$ to $C_{30}$ alkyl; $R_8$ is branched $C_3$ to $C_{30}$ alkyl; $X_1$ and $X_2$ are independently —C(O)O—, —C(O)NR$_9$—, —O—, —C(R$_9$)$_2$O—, -arylene-, -arylene-C(R$_9$)$_2$O—, -arylene-C(R$_9$)$_2$N(R$_{10}$)— or -arylene-C(R$_9$)$_2$N$^+$(R$_{10}$)$_2$—; $R_9$ and $R_{10}$ is independently hydrogen or a $C_1$ to $C_4$ alkyl; and wherein a molar ratio of the monomer of Formula 1 to the monomer of Formula 2 is from about 1.5:1 to about 15:1. The compounds are useful as viscosifying agents in oil and gas applications.

19 Claims, 2 Drawing Sheets

(56) References Cited

U.S. PATENT DOCUMENTS

| | | | |
|---|---|---|---|
| 4,025,484 A | 5/1977 | Evani et al. | |
| 4,029,872 A | 6/1977 | Evani et al. | |
| 4,029,873 A | 6/1977 | Evani et al. | |
| 4,029,874 A | 6/1977 | Evani et al. | |
| 4,038,265 A | 7/1977 | Evani et al. | |
| 4,080,304 A | 3/1978 | Smith | |
| 4,151,341 A | 4/1979 | Lalk et al. | |
| 4,330,414 A | 5/1982 | Hoover | |
| 4,528,348 A | 7/1985 | Turner et al. | |
| 4,702,319 A | 10/1987 | Bock et al. | |
| 6,417,268 B1 | 7/2002 | Zhang et al. | |
| 7,081,439 B2 | 7/2006 | Sullivan et al. | |
| 9,228,123 B2 | 1/2016 | Song et al. | |
| 9,290,720 B2 | 3/2016 | Blondel | |
| 9,315,717 B2 | 4/2016 | Pfeuffer et al. | |
| 9,334,428 B2 | 5/2016 | Lewandowski et al. | |
| 2002/0004464 A1 | 1/2002 | Nelson et al. | |
| 2003/0022568 A1* | 1/2003 | Branham | C08F 8/44 442/59 |
| 2007/0281869 A1 | 12/2007 | Drochon et al. | |
| 2008/0103248 A1 | 5/2008 | Suau et al. | |
| 2010/0009387 A1 | 1/2010 | Cheng | |
| 2010/0093874 A1* | 4/2010 | Monin | C08F 220/60 514/772.4 |
| 2010/0331510 A1* | 12/2010 | Reichenbach-Klinke | C08F 228/02 526/274 |
| 2011/0048716 A1 | 3/2011 | Ezell | |
| 2011/0223125 A1* | 9/2011 | Hough | A61K 8/86 424/70.12 |
| 2012/0024529 A1 | 2/2012 | van Zanten et al. | |
| 2012/0125606 A1 | 5/2012 | Reichenbach-Klinke et al. | |
| 2012/0129734 A1 | 5/2012 | Reichenbach-Klinke et al. | |
| 2012/0132420 A1 | 5/2012 | Langlotz et al. | |
| 2012/0255731 A1 | 10/2012 | Reichenbach-Klinke et al. | |
| 2013/0274170 A1 | 10/2013 | Yuan-Huffman et al. | |
| 2014/0262293 A1 | 9/2014 | Song et al. | |
| 2014/0377553 A1 | 12/2014 | Clapper et al. | |
| 2015/0329660 A1 | 11/2015 | Bittner et al. | |
| 2015/0329669 A1 | 11/2015 | Bittner et al. | |
| 2016/0200963 A1 | 7/2016 | Reed et al. | |
| 2017/0101576 A1 | 4/2017 | Langlotz et al. | |
| 2018/0320316 A1* | 11/2018 | Zhao | D21H 17/26 |

FOREIGN PATENT DOCUMENTS

| | | |
|---|---|---|
| CN | 101392041 A | 3/2009 |
| CN | 101463116 A | 6/2009 |
| CN | 101475667 A | 7/2009 |
| CN | 101475691 A | 7/2009 |
| CN | 101486782 A | 7/2009 |
| CN | 101492515 A | 7/2009 |
| CN | 101543748 B | 4/2011 |
| CN | 103554463 A | 2/2014 |
| CN | 104311755 A | 1/2015 |
| CN | 106479559 A | 3/2017 |
| EP | 2457973 A1 | 5/2012 |
| EP | 3 098 381 A1 | 11/2016 |
| WO | 2012/061147 A1 | 5/2012 |
| WO | 2012/069438 A1 | 5/2012 |
| WO | 2012/069477 A1 | 5/2012 |
| WO | 2012/136613 A1 | 10/2012 |
| WO | 2016/034743 A1 | 3/2016 |
| WO | 2016/083318 A1 | 6/2016 |
| WO | 2016/207554 A1 | 12/2016 |
| WO | 2017084379 A1 | 5/2017 |

OTHER PUBLICATIONS

International Search Report and Written Opinion dated Oct. 2, 2019 relating to PCT Application No. PCT/US2019/043584, 15 pages.
Sandau, Francoise et al., Hydrophobically-modified polyacrylamides prepared by micellar polymerization, Advances in Colloid and Interface Science 79 (1999), pp. 149-172.
Chao, Dongri et al., Poly(ethylene oxide) Macromonomers IX. Synthesis and Polymerization of Macromonomers Carrying Styryl End Groups with Enhanced Hydrophobicity, Polymer Journal, vol. 23, No. 9, pp. 1045-1052 (1991).
Gouveia, Laura M. et al., The effect of the ionic strength on the rheological behavior of hydrophobically modified polyacrylamide aqueous solutions mixed with sodium dodecyl sulfate (SDS) or cetyltrimethylammonium p-toluenesulfonate (CTAT), Colloids and Surfaces A: Physicochemical and Engineering Aspects 322 (2008), pp. 211-218.
Hwang, F.S. et al., Effects of Water-Soluble Spacers on the Hydrophobic Association of Fluorocarbon-Modified Poly(acrylamide), Macromolecules 1995, 28, pp. 3328-3335.
Ito, Koichi et al., Poly(ethylene oxide) Macromonomers. 7. Micellar Polymerization in Water, Macromolecules 1991, 24, pp. 2348-2354.
Noda, Tetsuya et al., Effects of Spacer Length on the Side-Chain Micellization in Random Copolymers of Sodium 2-(Acrylamido)-2-methylpropanesulfonate and Methacrylates Substituted with Ethylene Oxide-Based Surfactant Moieties, Macromolecules 2001, 34, pp. 1308-1317.
Ming-Yu, Rao, et al., Synthesis and Solution Properties of Comb-Like Acrylamide Copolymers, Polymer Materials Science and Engineering, vol. 25, No. 5, May 2009, 4 pages.
Rogovina, Lidiya Z. et al., Hydrophobically Associating Water-Soluble Polymers: A Dramatic Growth of Solution Viscosity and the Specificity of Physical Gel Formation, Macromol. Symp. 171, pp. 225-232 (2001).
Varadaraj, Ramesh et al., Effect of Hydrocarbon Chain Branching on Interfacial Properties of Monodisperse Ethoxylated Alcohol Surfactants, Journal of Colloid and Interface Science, vol. 147, No. 2, Dec. 1991, pp. 387-395.
Zhong, Chuanrong et al., Rheological Behavior of an Acrylamide-based Terpolymer with p-Vinylbenzyl-terminated Octylphenoxy Poly(ethylene oxide), Polymer Science, Ser. A, 2012, vol. 54, No. 10, pp. 809-820 (2012).
Zhong, Chuanrong et al., Surface and Interface Properties and Associated Behavior in Water and Brine Solutions of an Acrylamide-Based Terpolymer with a Macromonomer, Journal of Macromolecular Science, Part B: Physics 52:2 pp. 383-397 (2013).
Zhong, Chuanrong et al., Viscosity Behavior and Associated Morphologies of a Branched Acrylamide-Based Terpolymer in Water and Brine Solutions, Chemical Engineering Communications, 202 (2015) pp. 475-483.

(56) References Cited

OTHER PUBLICATIONS

Zhong, Chuanrong et al., Association in Unsalted and Brine Solutions of a Water-Soluble Terpolymer with p-Vinylbenzyl-Terminated Octylphenoxy Poly(ethylene oxide), J. Solution Chem (2011)40:1735-1754.

* cited by examiner

SALT-TOLERANT, FAST-DISSOLVING, WATER-SOLUBLE RHEOLOGY MODIFIERS

CROSS REFERENCE TO RELATED APPLICATIONS

This application claims priority to U.S. Provisional Patent Application Ser. No. 62/711,983 filed on Jul. 30, 2018, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

Copolymers and compositions containing copolymers having advantageous viscosity, dissolution, pH-stability, and temperature-stability are provided. These copolymers can be used as rheology modifiers for oil field applications.

BACKGROUND OF THE INVENTION

It is often necessary in the oil and petroleum industry to quickly and effectively increase the viscosity of high salinity fluids. This viscosifying behavior is necessary for carrying a proppant into a hydrocarbon-bearing formation during the hydraulic fracturing stage of well stimulation.

Hydrophobically modified polyelectrolytes are often used as viscosifiers in high salinity brines and muds. In the presence of a suitable surfactant they impart significantly higher viscosity to high salinity water than typical synthetic polyelectrolytes such as acrylamide/acrylate and acrylamide/2-acrylamido-2-methyl-1-propanesulfonate (AMPS) copolymers, due to their capability to form dynamic polymer networks.

Commonly used natural polymers like guar and xanthum gum exhibit good viscosifiying performance in high brines, but do not exhibit the desired biological resistance like synthetic polyelectrolytes. Furthermore, natural polymers have been shown to leave residuals that do not clear from the formation as well as synthetic polymers, leading to formation damage and reduced hydrocarbon production.

Thus, synthetic hydrophobically modified (HM) polyelectrolytes show the most promise for the desired application. However, they commonly suffer from an inability to dissolve quickly, adversely affecting the rate of viscosity build in high salinity water. It is often required that the viscosity build occurs within a few minutes during field application.

Thus, there is a need for proppant transport polymers that rapidly and effectively increase the viscosity of high salinity brines. Furthermore, the same fast-dissolving, viscosifying polymer can be used alone as a friction reducer or blended with an additional friction reducing polymer to provide a single, dual-use composition that can aid in a variety of well stimulation methods.

BRIEF SUMMARY OF THE INVENTION

A polyelectrolyte is provided which comprises repeat units derived from a nonionic monomer, an ionic monomer, a monomer having the structure of Formula 1, and a monomer having the structure of Formula 2,

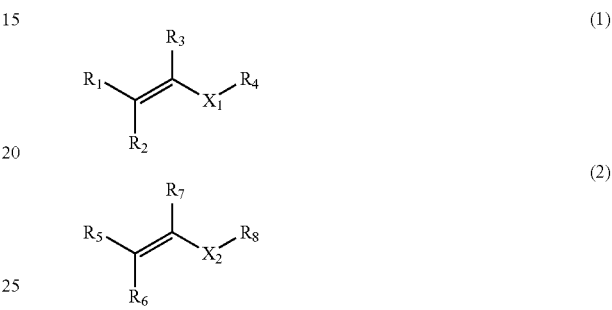

wherein $R_1$, $R_2$, $R_3$, $R_5$, $R_6$, and $R_7$ are independently hydrogen, unsubstituted alkyl, substituted alkyl, carbonyl, carboxyl, aryl, or alkaryl; $R_4$ is a linear $C_3$ to $C_{30}$ alkyl; $R_8$ is a branched $C_3$ to $C_{30}$ alkyl; $X_1$ and $X_2$ are each independently —C(O)O—, —C(O)NR$_9$—, —O—, —C(R$_9$)$_2$O—, arylene, arylene-C(R$_9$)$_2$O—, arylene-C(R$_9$)$_2$N(R$_{10}$)—, arylene-C(R$_9$)$_2$N$^+$(R$_{10}$)$_2$—; each $R_9$ and $R_{10}$ is independently hydrogen or a $C_1$ to $C_4$ alkyl and wherein a molar ratio of the monomer of Formula 1 to the monomer of Formula 2 is from about 1.5:1 to about 15:1.

The polyelectrolytes described herein can be derived from an ionic (e.g., anionic or cationic) monomer including 2-acrylamido2-methyl-1-propanesulfonic acid (AMPS), acrylic acid, methacrylic acid, 4-vinylbenzenesulfonic acid, [(2-acryloyloxy)ethyl]trimethylammonium chloride, [(2-methacryloyloxy)ethyl]trimethylammonium chloride, [(3-acrylamido)propyl]trimethylammonium chloride, [(3-methacrylamido)propyl]trimethylammonium chloride, a salt thereof, or a combination thereof; preferably, the ionic monomer comprises 2-acrylamido-2-methyl-1-propanesulfonic acid, or a salt thereof.

The polyelectrolytes described herein can be derived from nonionic monomers including acrylamide, N,N-dimethylacrylamide, N-vinylpyrrolidone, vinyl acetate, or a combination thereof; preferably, the nonionic monomer comprises acrylamide.

The polyelectrolytes described herein can consist essentially of repeat units derived from the nonionic monomer, the ionic monomer, a monomer having the structure of Formula 1, and a monomer having the structure of Formula 2.

The polyelectrolytes described herein wherein the molar ratio of the monomer of Formula 1 to the monomer of Formula 2 is from about 2:1 to about 12:1, from about 2:1 to about 10:1, from about 2:1 to about 9:1, from about 2:1 to about 8:1, from about 3:1 to about 12:1, from about 3:1 to about 10:1, from about 3:1 to about 9:1, from about 3:1 to about 8:1, from about 4:1 to about 12:1, from about 4:1 to about 10:1, from about 4:1 to about 9:1, from about 4:1 to about 8:1, from about 5:1 to about 12:1, from about 5:1 to about 10:1, from about 5:1 to about 9:1, from about 5:1 to about 8:1, from about 6:1 to about 12:1, from about 6:1 to about 10:1, from about 6:1 to about 9:1, and preferably from about 6:1 to about 8:1.

The polyelectrolytes described herein wherein $R_1$, $R_2$, $R_3$, $R_5$, $R_6$, and $R_7$ are independently hydrogen or $C_1$ to $C_4$ alkyl; preferably wherein $R_1$, $R_2$, $R_3$, $R_5$, $R_6$, and $R_7$ are hydrogen.

The polyelectrolytes described herein wherein $R_4$ is a linear $C_8$ to $C_{20}$ alkyl, preferably a linear $C_{10}$ to $C_{16}$ alkyl.

The polyelectrolytes described herein wherein $R_8$ is branched $C_8$ to $C_{20}$ alkyl, preferably a branched $C_{10}$ to $C_{18}$ alkyl and most preferably a branched $C_{10}$ to $C_{15}$ alkyl.

The polyelectrolytes described herein wherein $R_9$ is hydrogen.

The polyelectrolytes described herein wherein $R_{10}$ is $C_1$ to $C_4$ alkyl.

The polyelectrolytes described herein wherein $X_1$ and $X_2$ are —C(O)O—.

The polyelectrolytes described herein wherein the monomer having the structure of Formula 1 is lauryl acrylate and the monomer having the structure of Formula 2 is isotridecyl acrylate.

Compositions comprising a polyelectrolyte described herein in powder or granular form and a surfactant are also provided.

The surfactant in the compositions can comprise alcohol alkoxylate, alkyl phenol alkoxylate, polyethylene glycol sorbitan alkyl ester, ethylene oxide-propylene oxide block co-polymer, fatty acid alkoxylate, fatty amine alkoxylate, castor oil alkoxylate, tristyrlphenol alkoxylate, alkyl polyglycoside, or a combination thereof. Preferably, the surfactant comprises polyoxyethylene isotridecyl alcohol, a polyoxyethylene undecanol, a polyoxyethylene isodecanol, or a combination thereof.

The compositions described herein can further comprise an anti-caking agent, an adsorbent, or a drying agent. The anti-caking agent, adsorbent, or drying agent can comprise silica, alumina, or a combination thereof.

The compositions described herein can further comprise a carrier fluid. The polyelectrolyte described herein can be dispersed in the carrier fluid.

The carrier fluid of the compositions can comprise a glycol, a glycol ether, or an alcohol. The glycol ether can be polyethylene glycol, ethylene glycol butyl ether, ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, polyethylene glycol methyl ether, polyethylene glycol ethyl ether, polyethylene glycol propyl ether, polyethylene glycol butyl ether, propylene glycol, dipropylene glycol, dipropylene glycol methyl ether, dipropylene glycol ethyl ether, dipropylene glycol propyl ether, dipropylene glycol butyl ether, polypropylene glycol, solketal (isopropylidene glycerol), benzyl alcohol, propylene carbonate, or a combination thereof.

The compositions described herein can further comprise an antioxidant, a rheology modifier, a friction reducer, or a combination thereof. Preferably, the compositions comprise a rheology modifier (e.g. fumed silica, polyurea, castor oil derivative, block copolymers, organoclay).

The compositions can have the polyelectrolyte comprise from about 50 wt. % to about 55 wt. %, the carrier fluid comprise from about 40 wt. % to about 45 wt. %, the surfactant comprise from about 1 wt. % to 10 wt. %, and the rheology modifier comprise from about 1 wt. % to 2 wt. % of the composition, based on the total mass of the polyelectrolyte, carrier fluid, surfactant, and rheology modifier.

The compositions described herein can have the carrier fluid be a mixture of di-, tri-, tetra-, and polyethylene glycol monoethyl ethers, the surfactant be a $C_{11}$ alcohol ethoxylate, and the rheology modifier be a hydrophobic fumed silica powder, post treated with polydimethyl siloxane.

A method is provided for synthesizing the polyelectrolyte described herein comprising reacting a nonionic monomer, an ionic monomer, a monomer having the structure of Formula 1 and a monomer having the structure of Formula 2 in the presence of a surfactant.

The methods described herein can have the polyelectrolyte be synthesized using a micellar polymerization, an inverse macroemulsion, an inverse microemulsion, or a dispersion polymerization method. Preferably, the polyelectrolyte is synthesized using the micellar polymerization method.

When the polyelectrolyte is synthesized using the micellar polymerization method, the monomer concentration can be about 25 wt. % to about 50 wt. %.

Further, disclosed herein, are methods of increasing the viscosity of an aqueous solution comprising contacting the polyelectrolytes or compositions described herein with the aqueous solution, whereby the viscosity of the aqueous solution is increased.

For the methods described herein, the aqueous solution can have a salinity from about 4% to about 25% total dissolved solids.

The aqueous solution used in the methods described herein, can be a proppant transport solution.

When the aqueous solution is the proppant transport solution, the proppant transport solution can have a salinity at or above about 4% total dissolved solids, or from about 4% to about 25% total dissolved solids.

Further, the aqueous solution used in the methods described herein can be a water-based drilling mud.

The water-based drilling mud, used in the methods described herein, can comprise divalent cations.

The water-based drilling mud, used in the methods described herein, can comprise monovalent cations.

Other objects and features will be in part apparent and in part pointed out hereinafter.

BRIEF DESCRIPTION OF THE SEVERAL VIEWS OF THE DRAWING

Corresponding reference characters indicate corresponding parts throughout the drawings.

DETAILED DESCRIPTION OF THE INVENTION

Figure 1:
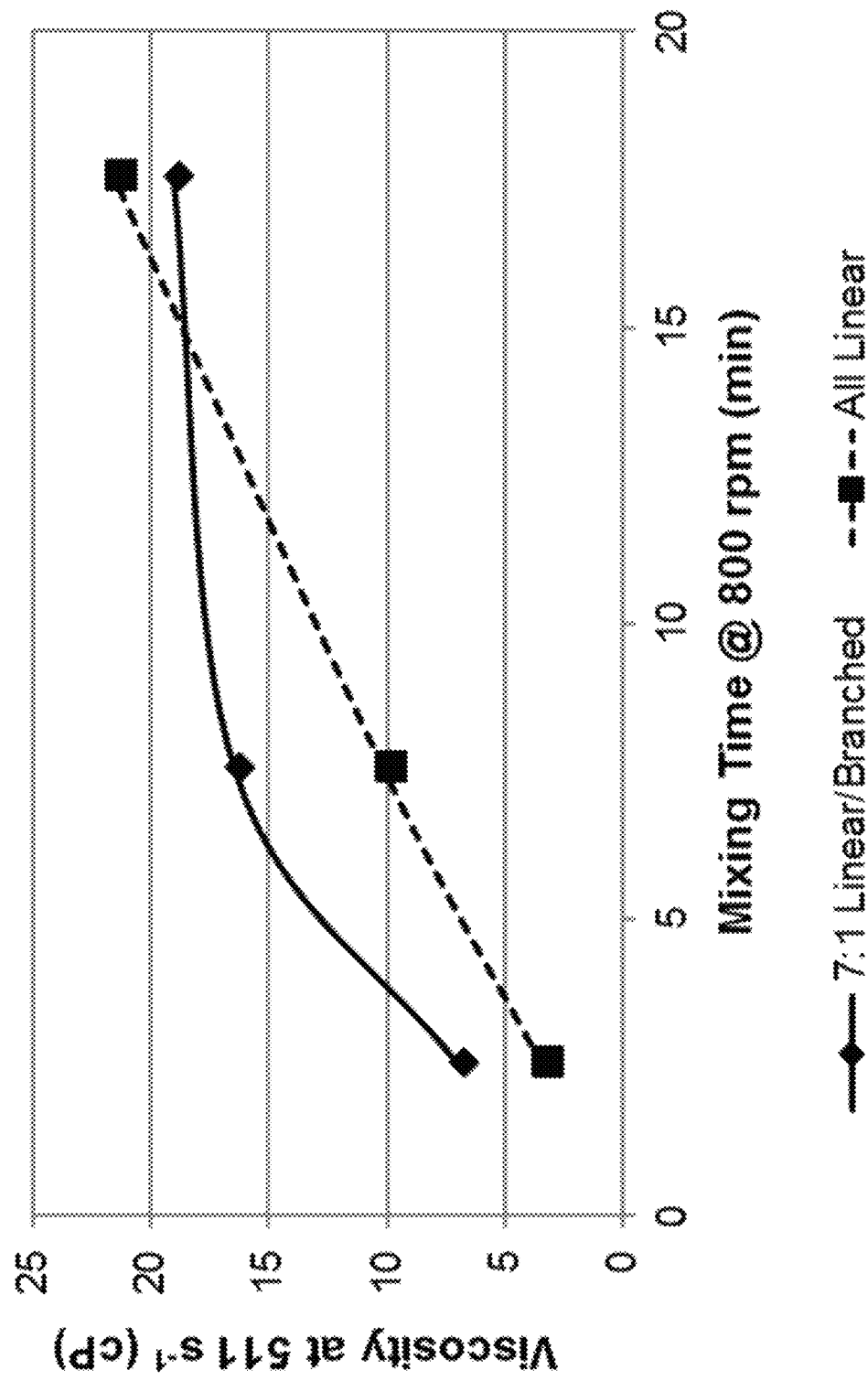
FIG. 1 is a graph of the viscosity versus the mixing time showing the viscosity of brines containing 0.25% of a polymer with 7:1 linear/branched ratio of hydrophobic monomers or polymer with all linear hydrophobic monomers as measured at 511 $s^{-1}$ at 2.5, 7.5, and 17.5 minutes of mixing at 800 rpm with a cage stirrer.

Disclosed herein are compounds and compositions, method of using the compounds and compositions, and processes for their preparation. The compounds and compositions are comprised of synthetic hydrophobically modified (HM) polyelectrolytes particularly useful for increasing viscosity in high salinity brines. They possess resilient viscosity profiles (viscosity over a range of shear rates) in target high brines and water-based drilling muds. Advantageously, the compositions and compounds disclosed herein have enhanced viscosity profiles in the presence of surfactants. Further, unlike typical HM polyelectrolytes which have slow dissolution properties in brines, the HM polyelectrolytes and compositions disclosed herein exhibit unusually fast dissolution in the target brines, allowing for the desired performance to be realized very quickly and making them suitable for a wide range of applications.

These advantages are rooted in the controlled combination of one or more monomers having linear substituents with one or more monomers having branched substituents. The presence of hydrophobic acrylic monomers having branched alkyl chains allows these polymers to dissolve in aqueous solutions more rapidly than polymers containing hydrophobic acrylic monomers having only linear alkyl chains. The branched/linear ratio is carefully considered so that the desired viscosifying performance of the resulting polymer is properly balanced with fast polymer dissolution. Fluids composed of the compounds described herein, in conjunction with a suitable surfactant, attain high viscosity in a variety of brines after only a few minutes of agitation. The unique properties of these polyelectrolytes provide advantage for various applications including, but not limited to, hydraulic fracturing, well completion, drilling and enhanced oil recovery. The polymers described herein have the potential to reduce the chemical footprint and simplify fracturing fluid formulation on the fracturing pad. Further, they can break down more effectively after application and clear from the formation, avoiding formation damage and subsequent reduced hydrocarbon production.

A class of fast dissolving, water soluble, hydrophobically modified polyelectrolytes (copolymers) are provided.

A polyelectrolyte is provided comprising a nonionic monomer, an ionic monomer, a monomer having the structure of Formula 1, and a monomer having the structure of Formula 2,

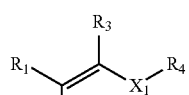

(1)

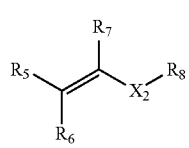

(2)

wherein $R_1$, $R_2$, $R_3$, $R_5$, $R_6$, and $R_7$ are independently hydrogen, unsubstituted alkyl, substituted alkyl, carbonyl, carboxyl, aryl, or alkaryl; $R_4$ is a linear $C_3$ to $C_{30}$ alkyl; $R_8$ is a branched $C_3$ to $C_{30}$ alkyl; $X_1$ and $X_2$ are each independently —C(O)O—, —C(O)NR$_9$—, —O—, —C(R$_9$)$_2$O—, arylene, arylene-C(R$_9$)$_2$O—, arylene-C(R$_9$)$_2$N(R$_{10}$)—, arylene-C(R$_9$)$_2$N$^+$(R$_{10}$)$_2$—; each $R_9$ and $R_{10}$ is independently hydrogen or $C_1$ to $C_4$ alkyl; and wherein a molar ratio of the monomer of Formula 1 to the monomer of Formula 2 is from about 1.5:1 to about 15:1.

The polyelectrolytes described herein can be derived from an ionic (e.g., anionic or cationic) monomer including 2-acrylamido2-methyl-1-propanesulfonic acid (AMPS), acrylic acid, methacrylic acid, 4-vinylphenylsulfonic acid, [(2-acryloyloxy)ethyl]trimethylammonium chloride, [(2-methacryloyloxy)ethyl]trimethylammonium chloride, [(3-acrylamido)propyl]trimethylammonium chloride, [(3-methacrylamido)propyl]trimethylammonium chloride, a salt thereof, or a mixture thereof. Preferably, the ionic monomer comprises 2-acrylamido-2-methyl-1-propanesulfonic acid, or a salt thereof.

The polyelectrolytes described herein can be derived from nonionic monomer including acrylamide, N,N-dimethylacrylamide, N-vinylpyrrolidone, vinyl acetate, or a combination thereof. Preferably, the nonionic monomer comprises acrylamide.

The polyelectrolytes described herein can have $R_1$, $R_2$, $R_3$, $R_5$, $R_6$, and $R_7$ each independently be hydrogen or $C_1$ to $C_4$ alkyl. Preferably, $R_1$, $R_2$, $R_3$, $R_5$, $R_6$, and $R_7$ can be hydrogen.

The polyelectrolytes described herein can have $R_4$ be a linear $C_8$ to $C_{20}$ alkyl or a linear $C_{10}$ to $C_{16}$ alkyl.

The polyelectrolytes described herein can have $R_8$ be a branched $C_8$ to $C_{20}$ alkyl, a branched $C_{10}$ to $C_{18}$ alkyl, or a branched $C_{10}$ to $C_{15}$ alkyl.

The polyelectrolytes described herein can have $X_1$ and $X_2$ comprise —C(O)O—, —C(O)NR$_9$—, —O—, —C(R$_9$)$_2$O—, arylene, arylene-C(R$_9$)$_2$O—, arylene-C(R$_9$)$_2$N(R$_{10}$)—, arylene-C(R$_9$)$_2$N$^+$(R$_{10}$)$_2$ and wherein $R_9$ is a hydrogen and wherein $R_{10}$ is $C_1$ to $C_4$ alkyl. Preferably, $X_1$ and $X_2$ comprise —C(O)O—.

The polyelectrolyte described herein can have the monomer having the structure of Formula 1 comprises decyl acrylate, decyl methacrylate, undecyl acrylate, lauryl acrylate, lauryl methacrylate, stearyl acrylate, or stearyl methacrylate. For example, the monomer having the structure of Formula 1 can comprise lauryl acrylate.

The polyelectrolyte described herein wherein the monomer having structure of Formula 2 comprises isotridecyl acrylate, 2-ethylhexyl acrylate, 2-propylheptyl acrylate, isodecyl methacrylate, isotridecyl methacrylate, or iso-heptadecyl acrylate (C17A). For example, the monomer having the structure of Formula 2 can comprise isotridecyl acrylate.

The polyelectrolyte described herein wherein the monomer having the structure of Formula 1 is lauryl acrylate and the monomer having the structure of Formula 2 is isotridecyl acrylate.

Additionally, the polyelectrolyte described herein can be derived from monomers comprising esters of acrylic acid and methacrylic acid that can be synthesized, using techniques described in US 2014/0377553A1, incorporated herein by reference, from other commercially available multiply-branched alcohols, including: the EXXAL™ series of alcohols from Exxon-Mobil, including EXXAL™ 8, EXXAL™ 9, EXXAL™ 10, and EXXAL™ 13. Other commercially available branched alcohols include FINEOXOCOL® 1600, FINEOXOCOL® 180, and FINEOXOCOL® 180N from Nisson Chemical.

The polyelectrolyte described herein can be derived from monomers prepared from another category of branched alcohols known as Guerbet alcohols that have the general structure of Formula 3:

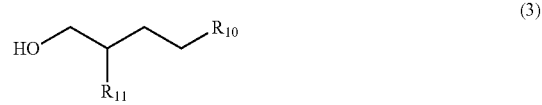

(3)

wherein $R_{10}$ and $R_{11}$ are each a linear hydrocarbon chain. These alcohols are singly branched. Example Guerbet alcohols of Formula 3 include 2-ethylhexanol and 2-propylheptanol. Higher Guerbet alcohols are available commercially from numerous manufacturers, including the ISOFOL® series from Sasol and the JARCOL™ series from Jarchem Industries.

Chemical transformations exist to convert the alcohols of Formula 3 into their corresponding amines, which can then be used to prepare corresponding N-alkyl(meth)acrylamide monomers. The branched alcohols and amines can also be used to prepare olefinic monomers other than (meth)acrylic acid derivatives, including but not limited to those derived from formulae 4-8

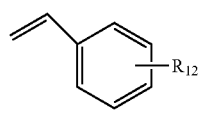
(4)

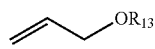
(5)

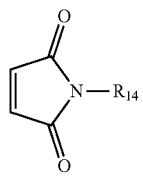
(6)

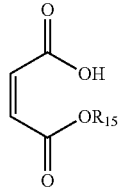
(7)

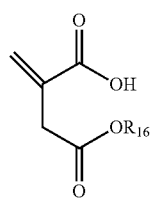
(8)

and wherein each $R_{12}$, $R_{13}$, $R_{14}$, $R_{15}$ and $R_{16}$ can be a branched $C_3$ to $C_{30}$ alkyl, a branched $C_8$ to $C_{20}$ alkyl, a branched $C_{10}$ to $C_{18}$ alkyl, or a branched $C_{10}$ to $C_{15}$ alkyl.

The polyelectrolytes described herein can be derived from a reaction solution comprising from about 50 mole percent to about 99 mole percent, from about 60 mole percent to about 99 mole percent, from about 70 mole percent to about 99 mole percent, from about 75 mole percent to about 99 mole percent, from about 50 mole percent to about 90 mole percent, from about 50 mole percent to about 80 mole percent, from about 50 mole percent to about 75 mole percent, from about 60 mole percent to about 90 mole percent, from about 60 mole percent to about 80 mole percent, from about 60 mole percent to about 75 mole percent, from about 70 mole percent to about 90 mole percent, from about 70 mole percent to about 80 mole percent, or from about 70 mole percent to about 75 mole percent of the nonionic monomer, based on the total moles of the nonionic monomer, ionic monomer, monomer having the structure of Formula 1 and the monomer having the structure of Formula 2. Preferably, the reaction solution comprises from about 60 mole percent to about 90 mole percent of the nonionic monomer, based on the total moles of the nonionic monomer, ionic monomer, monomer having the structure of Formula 1 and the monomer having the structure of Formula 2.

The polyelectrolytes described herein can be derived from a reaction solution comprising from about 5 mole percent to about 50 mole percent, from about 5 mole percent to about 40 mole percent, from about 5 mole percent to about 30 mole percent, from about 5 mole percent to about 25 mole percent, from about 10 mole percent to about 50 mole percent, from about 10 mole percent to about 40 mole percent, from about 10 mole percent to about 30 mole percent, from about 10 mole percent to about 25 mole percent, from about 20 mole percent to about 50 mole percent, from about 20 mole percent to about 40 mole percent, or from about 20 mole percent to about 30 mole percent, of the ionic monomer, based on the total moles of the nonionic monomer, ionic monomer, monomer having the structure of Formula 1 and the monomer having the structure of Formula 2. Preferably, the reaction solution comprises from about 10 mole percent to about 30 mole percent of the ionic monomer, based on the total moles of the nonionic monomer, ionic monomer, monomer having the structure of Formula 1 and the monomer having the structure of Formula 2.

The polyelectrolytes described herein can be derived from a reaction solution comprising from about 0.05 to about 0.4 mole percent, from about 0.06 to about 0.4 mole percent, from about 0.07 to about 0.4 mole percent, from about 0.08 to about 0.4 mole percent, from about 0.09 to about 0.4 mole percent, from about 0.1 to about 0.4 mole percent, from about 0.05 to about 0.4 mole percent, from about 0.08 to about 0.4 mole percent, from about 0.1 to about 0.4 mole percent, from about 0.2 to about 0.4 mole percent of the monomer having the structure of Formula 1, based on the total moles of the nonionic monomer, ionic monomer, monomer having the structure of Formula 1 and the monomer having the structure of Formula 2. Preferably, the reaction solution comprises from about 0.1 to about 0.4 mole percent of the monomer having the structure of Formula 1, based on the total moles of the nonionic monomer, ionic monomer, monomer having the structure of Formula 1 and the monomer having the structure of Formula 2.

The polyelectrolytes described herein can be derived from a reaction solution comprising from about 0.01 mole percent to about 0.2 mole percent, from about 0.02 mole percent to about 0.2 mole percent, from about 0.03 mole percent to about 0.2 mole percent, from about 0.04 mole percent to about 0.2 mole percent, from about 0.05 mole percent to about 0.2 mole percent, from about 0.02 to about 0.15 mole percent, from about 0.03 to about 0.15 mole percent, from about 0.04 to about 0.15 mole percent, or from about 0.04 to about 0.12 mole percent of the monomer having the structure of Formula 2, based on the total moles of the nonionic monomer, ionic monomer, monomer having the structure of Formula 1 and the monomer having the structure of Formula 2. Preferably, the reaction solution comprises from about 0.04 to about 0.12 mole percent of the monomer having the structure of Formula 2, based on the total moles of the nonionic monomer, ionic monomer, monomer having the structure of Formula 1 and the monomer having the structure of Formula 2.

The molar ratio of the monomer of Formula 1 to the monomer of Formula 2 can be from about 1.5:1 to about 15:1, from about 2:1 to about 14:1, from about 2:1 to about 13:1, from about 2:1 to about 12:1, from about 3:1 to about 11:1 from about 3:1 to about 10:1, from about 4:1 to about 9:1, from about 5:1 to about 8:1, from about 6:1 to about 8:1 or from about 2:1 to about 4:1. Preferably, the molar ratio of the monomer of Formula 1 to the monomer of Formula 2 is about 7:1.

The weight average molecular weight of the polyelectrolyte can be from about 1,000,000 to about 20,000,000 Daltons, from about 1,000,000 to about 18,000,000 Daltons, from about 1,000,000 to about 16,000,000 Daltons, from about 1,000,000 to about 14,000,000 Daltons, from about 1,000,000 to about 12,000,000 Daltons, from about 1,000,000 to about 10,000,000 Daltons, from about 2,000,000 to about 20,000,000 Daltons, from about 2,000,000 to about 18,000,000 Daltons, from about 2,000,000 to about 16,000,000 Daltons, from about 2,000,000 to about 14,000,000 Daltons, from about 2,000,000 to about 12,000,000 Daltons, or from about 2,000,000 to about 10,000,000 Daltons. Preferably, the weight average molecular weight of the polyelectrolyte can be from about 2,000,000 to about 10,000,000 Daltons.

Compositions comprising a surfactant and the polyelectrolyte described herein are also disclosed. The surfactant can comprise alcohol alkoxylate, alkyl phenol alkoxylate, polyethylene glycol sorbitan alkyl ester, ethylene oxide-propylene oxide block polymer, fatty acid alkoxylate, fatty amine alkoxylate, castor oil alkoxylate, tristyrlphenol alkoxylate, alkyl polyglycoside, or a combination thereof. Preferably, the surfactant comprises polyoxyethylene isotridecyl alcohol, a polyoxyethylene undecanol, a polyoxyethylene isodecanol, or a combination thereof.

The compositions described herein can have an advantageous dissolution rate in aqueous solution. For example, the viscosity of a polyelectrolyte having a concentration of from about 0.2 wt. % to about 0.6 wt. % in a brine solution (11.3% total dissolved solids) is from about 10 cP to about 25 cP measured at a shear rate of 511 $s^{-1}$ after about 2 minutes to about 8 minutes of mixing at a rate of about 800 rpm.

The viscosity profile in an aqueous solution of the compositions described herein can be from about 10 cP to about 35 cP at a shear rate of about 511 $s^{-1}$ and from about 100 to 2000 cP at a shear rate of about 17 $s^{-1}$ at a polyelectrolyte concentration from about 0.2 to about 0.6 wt. % in a brine solution.

Compositions described herein can be formulated as a powder or in granular form. When formulated as a powder or in granular form, the compositions can further comprise an anti-caking agent, an adsorbent, or a drying agent. The anti-caking agent, adsorbent, or drying agent can comprise silica, alumina, or a combination thereof.

Compositions described herein can further comprise a carrier fluid. The polyelectrolyte can be dispersed in the carrier fluid. The carrier fluid can comprise a glycol, a glycol ether, or an alcohol. The glycol ether can be polyethylene glycol, ethylene glycol butyl ether, ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, polyethylene glycol methyl ether, polyethylene glycol ethyl ether, polyethylene glycol propyl ether, polyethylene glycol butyl ether, propylene glycol, dipropylene glycol, dipropylene glycol methyl ether, dipropylene glycol ethyl ether, dipropylene glycol propyl ether, dipropylene glycol butyl ether, polypropylene glycol, solketal (isopropylidene glycerol), benzyl alcohol, propylene carbonate, or a combination thereof.

Compositions described herein can further comprise a stabilizer, an antioxidant, a rheology modifier, a friction reducer or a combination thereof. Preferably, the compositions further comprise a rheology modifier such as, for example, fumed silica, polyurea, organoclay, a castor oil derivative, or a styrene-ethylene/propylene-styrene block copolymer.

The compositions described herein can have the polyelectrolytes described herein comprise from about 30 wt. % to about 70 wt. %, from about 30 wt. % to about 65 wt. %, from about 30 wt. % to about 60 wt. %, from about 30 wt. % to about 55 wt. %, from about 30 wt. % to about 50 wt. %, from about 35 wt. % to about 70 wt. %, from about 35 wt. % to about 65 wt. %, from about 35 wt. % to about 60 wt. %, from about 35 wt. % to about 55 wt. %, from about 35 wt. % to about 50 wt. %, from about 40 wt. % to about 70 wt. %, from about 40 wt. % to about 65 wt. %, from about 40 wt. % to about 60 wt. %, from about 40 wt. % to about 55 wt. %, from about 40 wt. % to about 60 wt. %, from about 40 wt. % to about 55 wt. %, from about 40 wt. % to about 50 wt. %, from about 45 wt. % to about 70 wt. %, from about 45 wt. % to about 65 wt. %, from about 45 wt. % to about 60 wt. %, from about 45 wt. % to about 55 wt. %, of the total weight of the composition (i.e. the polyelectrolyte, surfactant (e.g., alcohol ethoxylate), carrier fluid (e.g., glycol ether), and rheology modifier (e.g., fumed silica)). Preferably, the compositions described herein can have the polyelectrolytes described herein comprise from about 45 wt. % to about 55 wt. % of the total weight of the composition (i.e. the polyelectrolyte, surfactant (e.g., alcohol ethoxylate), carrier fluid (e.g., glycol ether), and rheology modifier (e.g., fumed silica)).

The compositions described herein can also have the carrier fluid comprise from about from about 20 wt. % to about 70 wt. %, from about 20 wt. % to about 65 wt. %, from about 20 wt. % to about 60 wt. %, from about 20 wt. % to about 55 wt. %, from about 20 wt. % to about 50 wt. %, from about 20 wt. % to about 45 wt. %, from about 30 wt. % to about 70 wt. %, from about 30 wt. % to about 65 wt. %, from about 30 wt. % to about 60 wt. %, from about 30 wt. % to about 55 wt. %, from about 30 wt. % to about 50 wt. %, from about 30 wt. % to about 45 wt. %, from about 35 wt. % to about 70 wt. %, from about 35 wt. % to about 65 wt. %, from about 35 wt. % to about 60 wt. %, from about 35 wt. % to about 55 wt. %, from about 35 wt. % to about 60 wt. %, from about 35 wt. % to about 55 wt. %, from about 35 wt. % to about 50 wt. %, from about 35 wt. % to about 45 wt. %, from about 40 wt. % to about 70 wt. %, from about 40 wt. % to about 65 wt. %, from about 40 wt. % to about 60 wt. %, from about 40 wt. % to about 55 wt. %, from about 40 wt. % to about 50 wt. %, from about 40 wt. % to about 45 wt. %, of the total weight of the composition (i.e. the polyelectrolyte, surfactant (e.g., alcohol ethoxylate), carrier fluid (e.g., glycol ether), and rheology modifier (e.g., fumed silica)).

The compositions described herein can also have the surfactant comprise from about 1 wt. % to about 15 wt. %, from about 1 wt. % to about 12.5 wt. %, from about 1 wt. % to about 10 wt. %, from about 1 wt. % to about 7.5 wt. %, from about 1 wt. % to about 6 wt. %, from about 2.5 wt. % to about 15 wt. %, from about 2.5 wt. % to about 12.5 wt. %, from about 2.5 wt. % to about 10 wt. %, from about 2.5 wt. % to about 7.5 wt. %, from about 2.5 wt. % to about 6 wt. %, from about 4 wt. % to about 15 wt. %, from about 4 wt. % to about 12.5 wt. %, from about 4 wt. % to about 10 wt. %, from about 4 wt. % to about 7.5 wt. %, from about 4 wt. % to about 6 wt. %, from about 5 wt. % to about 15 wt. %, from about 5 wt. % to about 12.5 wt. %, from about 5 wt. % to about 10 wt. %, from about 5 wt. % to about 7.5 wt. %, from about 5 wt. % to about 6 wt. %, of the total weight of the composition (i.e., the polyelectrolyte, surfactant (e.g., alcohol ethoxylate), carrier fluid (e.g., glycol ether), and rheology modifier (e.g., fumed silica)).

The compositions described herein can also have the rheology modifier comprise from about 0.1 wt. % to about 5 wt. %, from about 0.1 wt. % to about 4 wt. %, from about 0.1 wt. % to about 3 wt. %, from about 0.1 wt. % to about 2 wt. %, from about 0.1 wt. % to about 1.5 wt. %, from about 0.5 wt. % to about 5 wt. %, from about 0.5 wt. % to about 4 wt. %, from about 0.5 wt. % to about 3 wt. %, from about 0.5 wt. % to about 2 wt. %, from about 0.5 wt. % to about 1.5 wt. %, from about 1 wt. % to about 5 wt. %, from about 1 wt. % to about 4 wt. %, from about 1 wt. % to about 3 wt of the total weight of the composition (i.e., the polyelectrolyte, surfactant (e.g., alcohol ethoxylate), carrier fluid (e.g., glycol ether), and rheology modifier (e.g., fumed silica)).

The compositions described herein can have the polyelectrolyte comprise from about 50 wt. % to about 55 wt. %, the carrier fluid comprise from about 40 wt. % to about 45 wt. %, the surfactant comprise from about 5 wt. % to 10 wt. % and the rheology modifier comprise from about 1 wt. % to 2 wt. % of the composition, based on the total mass of the polyelectrolyte, carrier fluid, surfactant, and rheology modifier. Preferably, the carrier fluid is a mixture of di-, tri-, tetra-, and polyethylene glycol monoethyl ethers (Glycol Ether HE from LyondellBasell), the surfactant is a $C_{11}$ alcohol ethoxylate (Tomadol® 1-7 from Evonik), and the rheology modifier is a hydrophobic fumed silica powder, post treated with polydimethyl siloxane (Aerosil® R202 from Evonik).

The compositions described herein also can provide friction reduction for a fluid flowing in a conduit. For example, the friction in a flow loop is measured at a constant flow rate and the pressure drop is measured with and without the copolymer in the composition. The friction reduction is calculated as follows:

% friction reduction=100×($P1-P2$)/$P1$.

P1 is the initial pressure drop and P2 is the pressure drop after the addition of the friction reducer.

The friction reduction can be from about 10% to about 80% at a concentration of 0.025% or 0.5 gpt in brine of salinity between 4% and 25%.

A method is provided of synthesizing the polyelectrolyte as described herein comprising reacting a nonionic monomer, an ionic monomer, a monomer having the structure of Formula 1, and a monomer having the structure of Formula 2 in the presence of a surfactant.

The methods described herein can have the polyelectrolyte be synthesized using a micellar polymerization, an inverse macroemulsion, an inverse microemulsion, or a dispersion polymerization method. Preferably, the polyelectrolyte is synthesized using a micellar polymerization method.

The reaction mixture for preparing the polyelectrolytes described herein can have the monomer concentration be from about 10 wt. % to about 60 wt. %, from about 10 wt. % to about 55 wt. %, from about 10 wt. % to about 50 wt. %, from about 15 wt. % to about 60 wt. %, from about 15 wt. % to about 55 wt. %, from about 15 wt. % to about 50 wt. %, from about 20 wt. % to about 60 wt. %, from about 20 wt. % to about 55 wt. %, from about 20 wt. % to about 50 wt. %, from about 25 wt. % to about 60 wt. %, from about 25 wt. % to about 55 wt. %, based on the total weight of the reaction mixture; preferably, the monomer concentration is from about 25 wt. % to about 50 wt. % based on the total weight of the monomers.

The polyelectrolytes described herein can be prepared by preparing a monomer phase. The monomer phase can be prepared by placing in a reaction vessel a monomer phase containing the nonionic monomer, the ionic monomer, the monomer having the structure of Formula 1, the monomer having the structure of Formula 2, a surfactant, and water. After the reaction mixture is mixed to form a homogenous mixture, the pH is adjusted to the desired value (e.g., pH of 6-7). A redox and thermal initiator, a chelating agent, a chain transfer agent, and an antifoamer can be added to the monomer phase.

The chelating agent can be ethylenediaminetetraacetic acid, diethylenetriaminepentaacetic acid, citric acid, N-(hydroxyethyl)ethylenediaminetriacetic acid, or a salt thereof, or a combination thereof.

The chain transfer agent can be isopropanol; formic acid or hypophosphorous acid, or a salt thereof; a mercaptan such as 2-mercaptoethanol; or a combination thereof.

Additionally, the monomer phase can contain a polymerization surfactant (e.g., a surfactant that is not able to be polymerized under the reaction conditions). The polymerization surfactant can be anionic, cationic, or zwitterionic surfactant, or a combination thereof.

For example, the polymerization surfactant can be an alkyl sulfate, a tetraalkyl ammonium, a sultaine, a betaine, a salt thereof, or a combination thereof. For example, the polymerization surfactant can be a $C_8$-$C_{24}$ alkyl sulfate, a $C_8$-$C_{24}$ alkyl tri($C_1$-$C_4$ alkyl)ammonium, an alkylamidoalkyl hydroxy sultaine, an alkylaminoalkyl betaine, a salt thereof, or a combination thereof. Preferably, the polymerization surfactant is sodium dodecylsulfate, sodium dodecylbenzenesulfonate, cetyltrimethylammonium bromide, cetyltrimethylammonium chloride, cocamidopropyl hydroxysultaine, cocamidopropyl betaine, or a combination thereof.

The weight ratio of the polymerization surfactant to the monomers having the structure of Formulae 1 and 2 in the monomer phase can be from about 2:1 to about 10:1, from about 2:1 to about 9:1, from about 2:1 to about 8:1, from about 2:1 to about 7:1, from about 2:1 to about 6:1, from about 2:1 to about 5:1, from about 2:1 to about 4.5:1, from about 3:1 to about 10:1, from about 3:1 to about 9:1, from about 3:1 to about 8:1, from about 3:1 to about 7:1, from about 3:1 to about 6:1, from about 3:1 to about 5:1, from about 3:1 to about 4.5:1, from about 3.5:1 to about 10:1, from about 3.5:1 to about 9:1, from about 3.5:1 to about 8:1, from about 3.5:1 to about 7:1, from about 3.5:1 to about 6:1, from about 3.5:1 to about 5:1, from about 3.5:1 to about 4.5:1. Preferably, the ratio of the polymerization surfactant to the monomers having the structure of Formulae 1 and 2 in the monomer phase can be about 4:1.

The ratio of the polymerization surfactant to the monomers having the structure of Formulae 1 and 2 in the monomer phase affects the copolymer structure because when the ratio is high so that there are more equivalents of the surfactant than the monomers having the structure of Formulae 1 and 2, the monomers having the structure of Formulae 1 and 2 are more evenly spread throughout the backbone of the copolymer that further includes the nonionic and ionic monomers. This structure results because the micelles that form from the surfactant and the monomers having the structure of Formulae 1 and 2 have more surfactant molecules than monomers in the micelle, and thus, the monomers having the structure of Formulae 1 and 2 are more spread out in the reaction mixture and react with the radical end unit of the growing polymer one or a few at a time. In contrast, when there is a low surfactant concentration, the monomers having the structure of Formulae 1 and 2 form micelles with few or no surfactant molecules in the micelle, so they are close together when reacting with the radical end unit of the growing polymer and due to this proximity, many monomers having the structure of Formulae 1 and 2 are reacted in a row before the other nonionic and ionic monomers react with the radical end unit.

Once the monomer phase is prepared, it is purged with nitrogen gas and an inhibitor, a thermal initiator and a redox initiator are added with a short period between the additions of each agent. The polymerization is started by adding another redox initiator.

After the polymerization reaction is completed, the polymer gel is collected and trimmed to obtain the core of the gel. The core is cut up into pieces and weighed. A lubricant is added to the gel and mixed well. The gel is cut using a gel cutter and the cut pieces are placed on a screen and dried before milling into a powder with and sifted to retain the desired size particles.

Alternatively, after the polymerization reaction is completed the polymer gel can be collected and shredded into small pieces with a meat grinder. The shredded gel is then spread onto a baking tray and dried in an oven. The dried granules are then ground using a mill. The powder is collected by a cyclone separation accessory aided by vacuum suction.

As a final product the dry powder can be suspended in a liquid non-solvent along with a suitable surfactant and any necessary rheology modifiers (to prevent the settling of solids). Regardless of how the suspension is formed, the suspension itself plays a key role in the performance of the polyelectrolytes disclosed herein. Not only does it allow delivery of the polymer as an easily applied fluid to the application, but the dispersion of the polymer in the carrier fluid improves its performance compared to use of the dry polymer alone. The necessary components of the suspension will vary depending on the nature of the polyelectrolyte. For instance, generally a polar non-solvent such as glycol ether is preferred because it is miscible in water. Solvents that are immiscible with water, such as oil, will adversely interact with the polyelectrolyte and reduce performance. Additionally, the correct choice and amount of surfactant to be included in the suspension is important for performance of the final product and will be strongly dependent on the nature of the polyelectrolyte.

Finally, other components such as stabilizers, antioxidants, and rheology modifiers can be added, as needed, to the polyelectrolyte suspension formulation.

A method of increasing the viscosity of an aqueous solution comprising contacting the polyelectrolyte described herein or any composition comprising the polyelectrolyte, as described herein, with an aqueous solution, thereby increasing the viscosity of the aqueous solution. The methods described herein, wherein the copolymer is used for increasing viscosity, the concentration of the polyelectrolyte in the aqueous solution is from about 0.02% to about 1%, from about 0.02% to about 0.8%, from about 0.02% to about 0.6%, from about 0.02% to about 0.4%, from about 0.05% to about 1%, from about 0.05% to about 0.8%, from about 0.05% to about 0.6%, from about 0.05% to about 0.4%, from about 0.08% to about 1%, from about 0.08% to about 0.8%, from about 0.08% to about 0.6%, from about 0.08% to about 0.4%, based on the total weight of the aqueous solution; preferably the concentration of polyelectrolyte in the aqueous solution is from about 0.1% to about 0.4% based on the total weight of the aqueous solution.

For the methods described herein, the aqueous solution can have a salinity of from about 3% to about 25%, from about 4% to about 25%, from about 5% to about 25%, from about 6% to about 25%, from about 7% to about 25%, from about 8% to about 25%, from about 9% to about 25%, or from about 10% to about 25% total dissolved solids. Preferably, the aqueous solution has a salinity from about 10% to about 25% total dissolved solids.

In methods described herein, the aqueous solution can comprise a fracturing fluid, proppant transport solution, a water-based drilling mud, or for enhanced oil recovery.

For the methods described herein, the proppant transport solution can have a salinity from about 3% to about 25%, from about 4% to about 25%, from about 5% to about 25%, from about 6% to about 25%, from about 7% to about 25%, from about 8% to about 25%, from about 9% to about 25%, or from about 10% to about 25% total dissolved solids. Preferably, the proppant transport solution has a salinity of at least 4% or from about 4% to about 25% total dissolved solids.

The aqueous solution can be a water-based drilling mud. The water-based drilling mud can have a salinity of from about 3% to about 25%, from about 4% to about 25%, from about 5% to about 25%, from about 6% to about 25%, from about 7% to about 25%, from about 8% to about 25%, from about 9% to about 25%, or from about 10% to about 25% total dissolved solids. Preferably, the water-based drilling mud has a salinity from about 10% to about 25% total dissolved solids.

The methods described herein can have the water-based drilling mud comprise divalent cations. Such divalent cations include magnesium, calcium, strontium, barium, iron, zinc, boron, aluminum, or a combination thereof. Alternately, the methods described herein can have the water-based drilling mud comprises monovalent cations. Such monovalent cations may include lithium, sodium, potassium, rubidium, cesium, ammonium, tetramethylammonium, tetraethylammonium, tetrabutylammonium, or a combination thereof.

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., arylalkyl) denote optionally substituted homocyclic aromatic groups, preferably monocyclic or bicyclic groups containing from 6 to 12 carbon atoms in the ring portion, such as phenyl, biphenyl, naphthyl, substituted phenyl, substituted biphenyl, or substituted naphthyl. Phenyl and substituted phenyl are the more preferred aryl groups. The term "aryl" also includes heteroaryl functional groups.

"Arylalkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

The term "substituted," as in "substituted aryl," "substituted alkyl," and the like, means that in the group in question (i.e., the alkyl, aryl, or other group that follows the term), at least one hydrogen atom bound to a carbon atom is replaced with one or more substituent groups such as hydroxy (—OH), alkylthio, amido (—CON($R_A$)($R_B$), wherein $R_A$ and $R_B$ are wherein $R_A$ and $R_B$ are independently hydrogen, alkyl, or aryl), amino (—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

The term "heterocyclo," "heterocycle," or "heterocyclyl," as used herein, refers to a monocyclic, bicyclic, or tricyclic group containing 1 to 4 heteroatoms selected from N, O, S(O)$_n$, P(O)$_n$, PR$^z$, NH or NR$^z$, wherein R$^z$ is a suitable substituent. Heterocyclic groups optionally contain one or two double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2 yl, tetrahydrofuran-3-yl, imidazolidin-1-yl, imidazolidin-2 yl, imidazolidin-4-yl, pyrrolidin-1-yl, pyrrolidin-2 yl, pyrrolidin-3-yl, piperidin-1-yl, piperidin-2 yl, piperidin-3-yl, piperazin-1-yl, piperazin-2 yl, piperazin-3-yl, 1,3-oxazolidin-3-yl, isothiazolidine, 1,3-thiazolidin-3-yl, 1,2 pyrazolidin-2 yl, 1,3-pyrazolidin-1-yl, thiomorpholin-yl, 1,2 tetrahydrothiazin-2 yl, 1,3-tetrahydrothiazin-3-yl, tetrahydrothiadiazin-yl, morpholin-yl, 1,2 tetrahydrodiazin-2 yl, 1,3-tetrahydrodiazin-1-yl, 1,4-oxazin-2 yl, and 1,2,5 oxathiazin-4-yl. Heterocyclic groups can be unsubstituted or substituted by one or more suitable substituents, preferably 1 to 3 suitable substituents, as defined above.

Having described the invention in detail, it will be apparent that modifications and variations are possible without departing from the scope of the invention defined in the appended claims.

EXAMPLES

The following non-limiting examples are provided to further illustrate the disclosed polymers and compositions.

Example 1: Synthesis of a 7:1 Linear to Branched Polyelectrolyte

In a large beaker, water, sodium dodecylsulfate, and 49.5% acrylamide solution was added in that order and the mixture was stirred until all solid dissolved. To this solution was added 58% sodium 2-acrylamido-2-methyl-1-propanesulfonate (NaAMPS) solution followed by lauryl acrylate (LA), isotridecyl acrylate (ITA), sodium formate, an antifoaming agent, and a high temperature thermal initiator. Chelant was added to the mixture, the pH of the mixture was adjusted to the 6.0-7.0 range, and 4-hydroxy-2,2,6,6-tetramethyl-1-piperidinyloxy (HTEMPO) delay agent was added.

The mixture was transferred to a plastic bag within a Dewar flask. A lid with three small holes was placed on the Dewar. A resistive temperature detector (RTD) and a gas purge line were run through two of the holes into the reaction mixture, while the third hole could be covered as needed. The mixture was purged with nitrogen gas for 50 minutes, and then dilute tert-butylhydroperoxide solution was added. The mixture was purged with nitrogen gas an additional ten minutes, after which dilute ferrous ammonium sulfate solution was added. An increase in temperature of the reaction mixture rapidly occurred. The gas purge line was removed after a temperature increase of about 5° C. The reaction was left for three hours to exotherm and then gradually cooled on its own. The bag was removed from the Dewar to allow the polymer gel within to cool more rapidly to ambient temperature. The polymer had a composition of 74.6% acrylamide, 25% NaAMPS, 0.35% LA and 0.05% ITA by molar ratio. The reaction mixture had a mass of 1.00 kg, 36.7% of which consisted of monomers.

The polymer was obtained as a firm gel following this procedure and was further processed into a dry powder by the following method. The gel was shredded into small pieces with a meat grinder. The shredded gel was spread onto a baking tray and dried in an oven at 90° C. overnight. The dried granules were ground using a Retsch ZM200 mill at 18000 rpm using a 12-tooth rotor and a 0.25 mm ring sieve. The powder was collected by a cyclone separation accessory aided by vacuum suction. All powder obtained by this method could pass through a 100 mesh sieve. The resulting polyelectrolyte (7:1 Linear/Branched) as a dry powder was approximately 90% solids by mass.

As a final product, the dry powder can be suspended in a water-miscible non-solvent along with a suitable surfactant and any necessary rheology modifiers (to prevent the settling of solids). The composition of a representative suspension is described in Table 1. To prepare the suspension, the polyelectrolyte powder was slowly stirred into a mixture of Aerosil R202 (Evonik) in Glycol ether-HE (Lyondell-Basell). The mixture was stirred using an overhead mixer at 200 rpm. The surfactant Tomadol® 1-7 ($C_{11}$ alcohol ethoxylate, Evonik) was then added and mixing continued for another 10 minutes.

TABLE 1

| Component description | Mass (g) | Mass (%) |
| --- | --- | --- |
| 7:1 Polyelectrolyte Powder | 41.60 | 51.6 |
| Glycol Ether HE | 33.44 | 41.5 |
| Tomadol ® 1-7 | 4.65 | 5.8 |
| Aerosil R202 (fumed silica) | 0.96 | 1.2 |

The polyelectrolyte has been tested as a dry powder as well as in suspension form.

Example 2: Linear Vs. Branched Hydrophobic Monomers

A series of polymers were prepared using the method described in Example 1. They were each prepared using 0.4 mol % total hydrophobic monomer (which was a combination of LA and ITA), 25 mol % AMPS polymer backbone and an acrylamide remainder. The surfactant used was sodium dodecylsulfate (SDS) in a 4:1 ratio to the total hydrophobic monomers. The specific mol % of LA and ITA and their ratios are described in Table 2.

TABLE 2

| Sample | Mol % Acrylamide | Mol % NaAMPS | Mol % LA | Mol % ITA | Linear/Branched Monomer Ratio | Dispersion |
|---|---|---|---|---|---|---|
| A | 74.6 | 25 | 0.4 | 0 | All linear | 45% polymer and 3.1% TDA-9 in PEG |
| B | 74.6 | 25 | 0.35 | 0.05 | 7:1 | 45% polymer and 4.1% TDA-9 in PEG |

The hydration rate of the all linear polymer (e.g., sample A) compared to a polymer having a 7:1 linear/branched ratio (e.g., sample B) were then compared. Each polymer was prepared as a suspension in PEG-400 along with an optimal amount of TDA-9 surfactant (e.g. Huntsman Surfonic® TDA-9), as described in Table 2. Each polymer dispersion was dissolved in brine containing 11.3% total dissolved solids (TDS), the formula of which is shown in Table 3, at an equivalent polymer concentration of 0.25% and subjected to shear force using a flat paddle stirrer (800 rpm). The viscosity at each time point for each sample is depicted in FIG. 1. It was noted that the 7:1 ratio achieved an optimal balance of hydration rate and viscosity.

TABLE 3

| Component | Concentration (mg/kg) |
|---|---|
| Sodium | 37,700 |
| Potassium | 500 |
| Magnesium | 900 |
| Calcium | 5900 |
| Strontium | 400 |
| Barium | 0 |
| Chloride | 68,000 |
| Sulfate | 0 |
| Total Dissolved Solids | 113,400 |
| Divalent Cations | 15.9% of the TDS |

Example 3: Comparison to Existing Products

Figure 2:
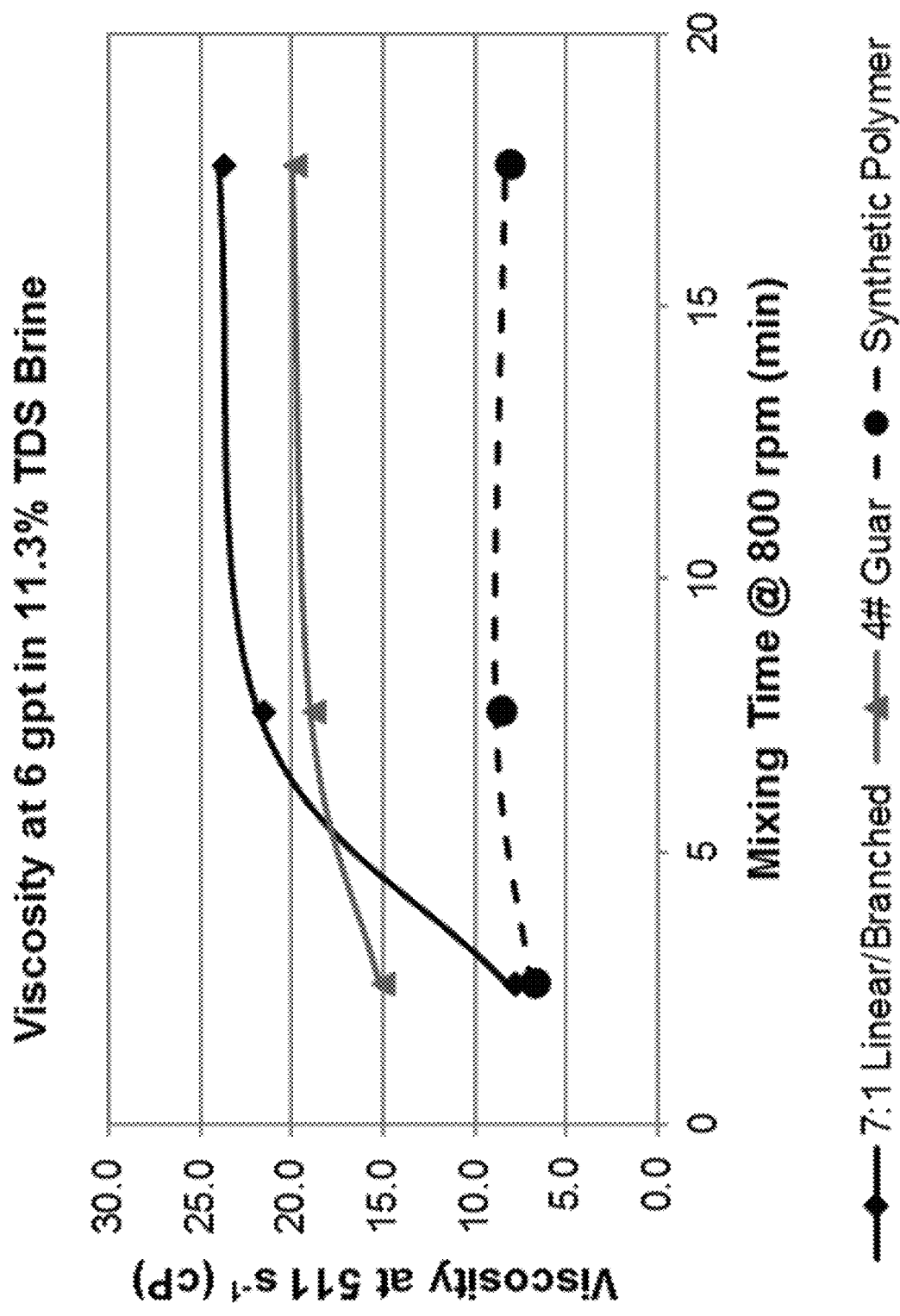
FIG. 2 is a graph of the viscosity versus the mixing time showing the viscosity of brines containing 6 gpt (gallons of dispersed polymer per 1000 gallons of fluid) of a 50% dispersion of 7:1 linear/branched polymer, a guar polymer dispersion (4 pounds per gallon, or 4 #), and a 50% dispersion of a non-hydrophobic synthetic polymer (25/75% NaAMPS/AAm), measured at 511 $s^{-1}$ at 2.5, 7.5, and 17.5 minutes of mixing at 800 rpm with a cage stirrer.

A suspension of the 7:1 linear/branched polyelectrolyte prepared in Example 1 was compared with two standard viscosifiers: guar slurry and a synthetic viscosifier. All three formulations used are described in Table 4. Note that the synthetic viscosifier is compositionally similar to the 7:1 linear/branched polymer but lacks the hydrophobic monomers. Each formulation was dissolved at 6 gallons of product per thousand gallons of brine (gpt) in 11.3% TDS brine and subjected mixing with an overhead stirrer at 800 rpm. The viscosity was measured at 511 s$^{-1}$ at three time points (2.5 min, 7.5 min and 17.5 min), and is depicted in FIG. 2. The 7:1 linear/branched polymer showed faster hydration and a greater viscosity after a shorter mixing time when compared to guar slurry and the synthetic polymer.

TABLE 4

| Formulation | Components |
|---|---|
| 7:1 Linear/Branched Polymer Suspension | 51.6% 7:1 linear/branched polymer fines |
| | 5.8% Tomadol 1-7 |
| | 1.2% rheology modifier/anti-settling aid |
| | 41.5% Glycol ether HE |
| 4# guar slurry | 4 lb/gal of premium guar powder in paraffin oil |
| Synthetic Viscosifier | 50% of 25% AMPS-acrylamide copolymer fines in paraffin oil |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved, and other advantageous results attained.

As various changes could be made in the above compositions and methods without departing from the scope of the invention, it is intended that all matter contained in the above description and shown in the accompanying drawings shall be interpreted as illustrative and not in a limiting sense.

The invention claimed is:

1. A hydrophobically modified polyelectrolyte comprising a nonionic monomer, an anionic monomer, a monomer having the structure of Formula 1, and a monomer having the structure of Formula 2,

(1)

(2)

wherein $R_1$, $R_2$, $R_3$, $R_5$, $R_6$, and $R_7$ are independently hydrogen, unsubstituted alkyl, substituted alkyl, carbonyl, carboxyl, aryl, or alkaryl;

$R_4$ is linear $C_3$ to $C_{30}$ alkyl;

$R_8$ is branched $C_3$ to $C_{30}$ alkyl;

$X_1$ and $X_2$ are independently —C(O)O—, —C(O)NR$_9$—, —O—, —C(R$_9$)$_2$O—, arylene, arylene-C(R$_9$)$_2$O—, arylene-C(R$_9$)$_2$N(R$_{10}$)—, arylene-C(R$_9$)$_2$N$^+$(R$_{10}$)$_2$—; and $R_9$ and $R_{10}$ is hydrogen or $C_1$ to $C_4$ alkyl;
wherein a molar ratio of the monomer of Formula 1 to the monomer of Formula 2 is from about 4:1 to about 15:1.

2. The polyelectrolyte of claim 1, wherein the anionic monomer comprises 2-acrylamido-2-methyl-1-propane-sulfonic acid, acrylic acid, methacrylic acid, 4-vinylbenzenesulfonic acid, a salt thereof, or a mixture thereof.

3. The polyelectrolyte of claim 2, wherein the anionic monomer comprises 2-acrylamido-2-methyl-1-propane-sulfonic acid, or a salt thereof.

4. The polyelectrolyte of claim 1, wherein the nonionic monomer comprises acrylamide, N,N-dimethylacrylamide, N-vinylpyrrolidone, vinyl acetate, or a combination thereof.

5. The polyelectrolyte of claim 3, wherein the nonionic monomer comprises acrylamide.

6. The polyelectrolyte of claim 1, wherein the molar ratio of the monomer of Formula 1 to the monomer of Formula 2 is from about 4:1 to about 12:1.

7. The polyelectrolyte of claim 4, wherein the molar ratio of the monomer of Formula 1 to the monomer of Formula 2 is from about 4:1 to about 10:1.

8. The polyelectrolyte of claim 5, wherein the molar ratio of the monomer of Formula 1 to the monomer of Formula 2 is from about 6:1 to about 8:1.

9. The polyelectrolyte of claim 1, wherein $R_1$, $R_2$, $R_3$, $R_5$, $R_6$, and $R_7$ are independently hydrogen or $C_1$ to $C_4$ alkyl.

10. The polyelectrolyte of claim 8, wherein $R_3$ and $R_7$ are hydrogen or methyl and $R_1$, $R_2$, $R_5$, and $R_6$ are hydrogen.

11. The polyelectrolyte of claim 10, wherein $R_4$ is linear $C_8$ to $C_{20}$ alkyl and $R_8$ is branched $C_8$ to $C_{20}$ alkyl.

12. The polyelectrolyte of claim 1, wherein $R_4$ is linear $C_{10}$ to $C_{16}$ alkyl.

13. The polyelectrolyte of claim 12, wherein $R_8$ is branched $C_{10}$ to $C_{18}$ alkyl.

14. The polyelectrolyte of claim 1, wherein $R_8$ is branched $C_{10}$ to $C_{15}$ alkyl.

15. The polyelectrolyte of claim 1, wherein $R_9$ is hydrogen and $R_{10}$ is $C_1$ to $C_4$ alkyl.

16. The polyelectrolyte of claim 1, wherein $X_1$ and $X_2$ are —C(O)O—.

17. A composition comprising the polyelectrolyte of claim 1 in powder or granular form and a surfactant.

18. A method of increasing the viscosity of an aqueous solution comprising contacting the polyelectrolyte of claim 1 with the aqueous solution, thereby increasing the viscosity of the aqueous solution.

19. A hydrophobically modified polyelectrolyte comprising a nonionic monomer, an ionic monomer, lauryl acrylate, and isotridecyl acrylate.

* * * * *